United States Patent
Zhang

(10) Patent No.: US 9,866,982 B2
(45) Date of Patent: *Jan. 9, 2018

(54) MICRO SPEAKER WITH CAPACITORS FORMED BY CONDUCTIVE DIAPHRAGM AND SEGMENTED POLE PLATE

(71) Applicant: AAC Technologies Pte. Ltd., Singapore (SG)

(72) Inventor: Yang Zhang, Shenzhen (CN)

(73) Assignee: ACC TECHNOLOGIES PTE. LTD., Singapore (SG)

( * ) Notice: Subject to any disclaimer, the term of this patent is extended or adjusted under 35 U.S.C. 154(b) by 41 days.

This patent is subject to a terminal disclaimer.

(21) Appl. No.: 15/011,462

(22) Filed: Jan. 29, 2016

(65) Prior Publication Data

US 2017/0013383 A1   Jan. 12, 2017

(30) Foreign Application Priority Data

Jul. 9, 2015   (CN) .................... 2015 2 0518126 U

(51) Int. Cl.
| | |
|---|---|
| H04R 1/00 | (2006.01) |
| H04R 29/00 | (2006.01) |
| H04R 9/02 | (2006.01) |
| G01D 5/20 | (2006.01) |
| H04R 3/00 | (2006.01) |
| H04R 7/16 | (2006.01) |
| H04R 19/00 | (2006.01) |

(52) U.S. Cl.
CPC ............. *H04R 29/003* (2013.01); *G01D 5/20* (2013.01); *H04R 3/007* (2013.01); *H04R 7/16* (2013.01); *H04R 9/025* (2013.01); *H04R 19/005* (2013.01); *H04R 2307/204* (2013.01)

(58) Field of Classification Search
CPC ... H04R 7/00; H04R 7/02; H04R 7/04; H04R 7/06; H04R 7/122; H04R 7/127; H04R 9/02; H04R 9/025; H04R 9/06; H04R 2209/024
USPC ....... 381/152, 162, 191, 396, 398, 399, 400, 381/412, 417, 418, 419, 420, 421, 422, 381/423, 424, 426, 427, 429, 430, 431
See application file for complete search history.

(56) References Cited

U.S. PATENT DOCUMENTS

| | | | | |
|---|---|---|---|---|
| 4,649,359 A | * | 3/1987 | Doki ........................ | G01D 5/20 335/222 |
| 2002/0067663 A1 | * | 6/2002 | Loeppert ............... | B81B 3/0072 367/181 |
| 2006/0120546 A1 | * | 6/2006 | Tanaka .................... | H04M 1/05 381/315 |

(Continued)

*Primary Examiner* — Katherine Faley
(74) *Attorney, Agent, or Firm* — Na Xu; IPro, PLLC

(57) ABSTRACT

A micro speaker is disclosed. The micro speaker includes a vibration system including a diaphragm and a voice coil for driving the diaphragm, the diaphragm including a conductive dome a suspension surrounding the conductive dome; a magnetic circuit system including a lower plate, a first magnetic part on the lower plate, a second magnetic part on the lower plate, a pole plate attached to the first magnetic part and including a plurality of units, one of the first and second magnetic part being a permanent magnet for forming a magnetic gap; capacitors formed by the conductive dome and the units of the pole plate for outputting electrical signals according to vibrations of the diaphragm and for detecting real-time replacement of the diaphragm.

10 Claims, 2 Drawing Sheets

(56) References Cited

U.S. PATENT DOCUMENTS

2006/0188126 A1\* 8/2006 Andersen ............... H04M 1/03
381/396
2016/0094917 A1\* 3/2016 Wilk ..................... H04R 19/02
381/398

\* cited by examiner

MICRO SPEAKER WITH CAPACITORS FORMED BY CONDUCTIVE DIAPHRAGM AND SEGMENTED POLE PLATE

FIELD OF THE INVENTION

The present invention relates to the field of electroacoustic transducers, more particularly to a micro speaker.

DESCRIPTION OF RELATED ART

The normal or typical method to detect the amplitude of the diaphragm of a speaker is linear estimation method. This type of method cannot detect the real-time amplitude of the diaphragm correctly.

The present invention provides an improved method or solution to detect the real-time amplitude of the diaphragm of a micro speaker.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of present disclosure more apparent, the present disclosure is described in further detail together with the Fig.s and the embodiments. It should be understood the specific embodiments described hereby is only to explain this disclosure, not intended to limit this disclosure.

Figure 1:
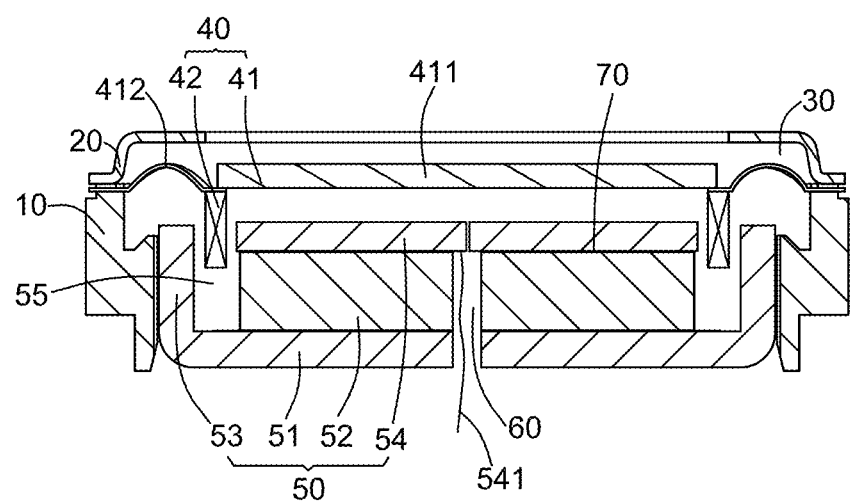
FIG. 1 is a cross-sectional view of a micro speaker in accordance with an exemplary embodiment of the present disclosure.

Referring to FIG. 1, a micro speaker 1 in accordance with a first embodiment of the present disclosure comprises a frame 10, a front cover 20 engaging with the frame 10, a receiving space 30 formed by the frame 10 and the front cover 20, a vibration system 40 and a magnetic circuit system 50 respectively received in the receiving space 30.

The vibration system 40 includes a diaphragm 41 and a voice coil 42 driving the diaphragm 41 to generate sounds. The diaphragm 41 includes a conductive dome 411 and a suspension 412 surrounding the conductive dome 411.

The magnetic circuit system 50 includes a lower plate 51, a first magnetic part 51 mounted on the lower plate 50, and a second magnetic part 53 located on the lower plate 50. At least one of the first and second magnetic parts 52, 53 is a permanent magnet. When one of the first and second magnetic parts 52, 53 is a permanent magnet, the other is a permanent magnet, or is a magnetic conduction component. The second magnetic part 53 surrounds and keeps a distance from the first magnetic part 52 thereby forming a magnetic gap 55 therebetween. The voice coil 42 is partially received in the magnetic gap 55. The magnetic circuit system 50 further includes a pole plate 54 attached to the first magnetic part 52. The lower plate 51 is not restricted to the structure shown in FIG. 1. In the present disclosure, any component having a part for supporting or carrying the first magnetic part 52 or the second magnetic part 53 should be construed as the lower plate. When the first magnetic part 52 is a permanent magnet, the second magnetic part 53 could be sidewalls extending from the lower plate 51, and the magnetic gap 55 is formed between the sidewalls and the first magnetic part. When the second magnetic part 53 is a permanent magnet, the first magnetic part 52 could be a pillar extending from the lower plate 51 and surrounded by the second magnetic part 53. When both of the first and second magnetic parts are permanent magnets, the lower plate 51 could be a planar plate for carrying the magnets.

Figure 2:
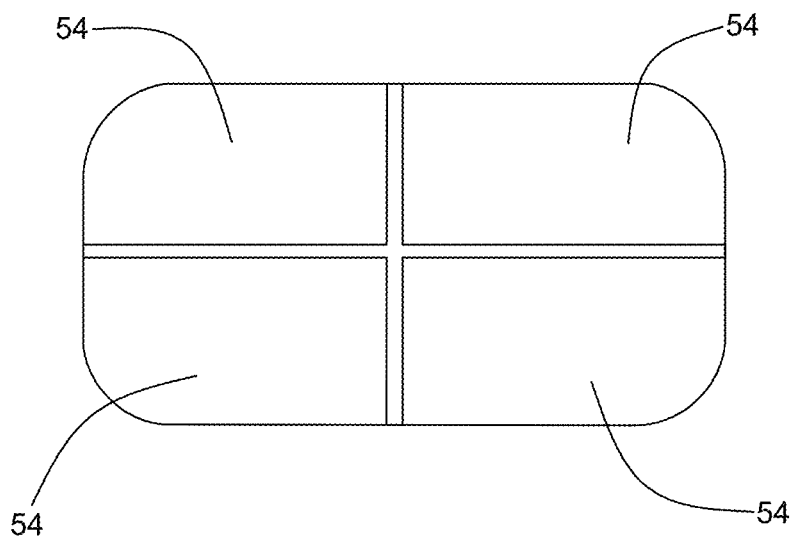
FIG. 2 is an illustration of a pole plate of the micro speaker in FIG. 1.

Referring to FIG. 1 together with FIG. 2, the magnetic circuit system 50 further includes a pole plate 54 attached to the first magnetic part 52. The pole plate 54 includes a plurality of units being isolated from each other. Each unit of the pole plates 54 forms a capacitor with the conductive dome 411. In this embodiment, the conductive dome 411 could be an aluminum foil dome or a compound aluminum foil dome. In fact, the conductive dome 411 could be a metallic dome, a multi-layer dome having a metallic layer, or a compound dome having conductivity.

When the diaphragm 41 vibrates, the conductive dome 411 will move synchronously. Accordingly, distances between the units of the pole plate 54 and the conductive dome 411 are changed. The values of the capacitors formed by the conductive dome 411 and the units of the pole plate 54 are thereby changed. Electrical signals outputted by the capacitors reflect the real-time amplitude of the diaphragm 41. In addition, according to each of the capacitors, unbalanced vibration of the diaphragm could also be detected. In this embodiment, the amount of the units of the pole plate is four, and accordingly four capacitors are formed.

Figure 3:
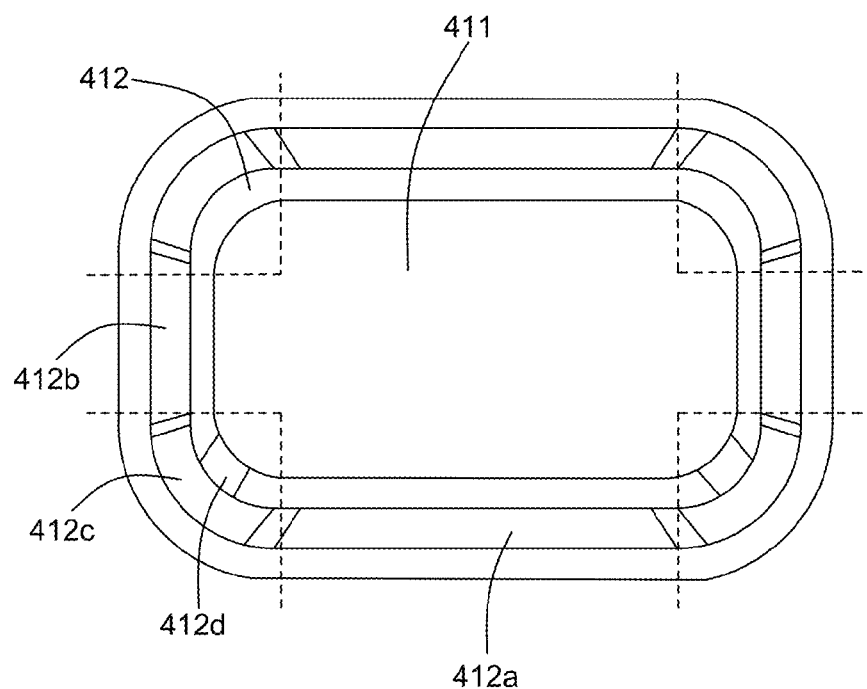
FIG. 3 is an illustration view of a diaphragm of the speaker in FIG. 1.

Referring to FIG. 3, the suspension 412 is made of silica, and includes a first part and a second part. The first part is made of non-conductive silica and the second part is made of conductive silica. The suspension 412 includes a pair of long sides 412a, a pair of short sides 412b, and arc sides 412c connecting the long sides and the short sides. In this embodiment, the second part is formed at the arc sides. Further, the suspension 412 includes conductive pads 412d located at the arc sides 412c. The conductive dome 411 is electrically connected to the conductive pads 412d, and electrical signals produced by the capacitor are outputted via the arc sides 412c. Of course, the second part could also be formed at the long sides 412a, and the conductive pads 412d could be located at the long sides.

Electrical signals produced by the capacitor are outputted via the long sides 412a. The second part could also be formed at the short sides 412b, and the conductive pads 412d could be located at the short sides. Electrical signals produced by the capacitor are outputted via the short sides 412b.

In this embodiment, the magnetic circuit system 50 includes a first through hole 60 penetrating the first magnetic part 52 and the lower plate 51. The pole plate 54 is provided with a lead wire 541. Electrical signals from the pole plate are outputted via the lead wire 541 through the first through hole 60. Be noted that the lead wire 541 could be a wire, or be a conductive pattern. Optionally, a non-conductive layer 70 is formed between the pole plate 54 and the first magnetic part 52.

Figure 4:
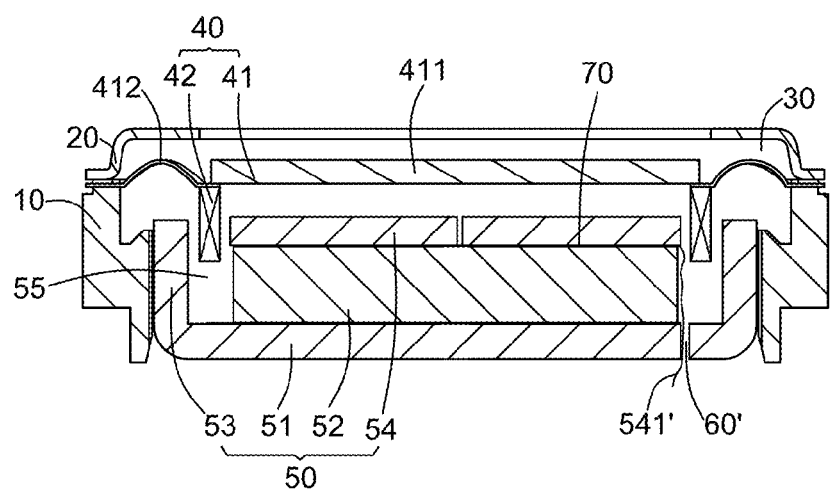
FIG. 4 is a cross-sectional view of a micro speaker in accordance with a second exemplary embodiment of the present disclosure.

Referring to FIG. 4, a micro speaker 2 in accordance with a second embodiment of the present disclosure is disclosed. The magnetic circuit system 50 includes a second through hole 60' penetrating the lower plate 51. The second through hole 60' is located in the magnetic gap 55. The pole plate 54 is provided with a lead wire 541' for outputting the electrical signals from the pole plate through the second through hole 60'. The lead wire 541' could be a wire, or be a conductive pattern.

By virtue of the configuration described above, the real-time amplitude of the diaphragm could be correctly detected. And, by virtue of the units of the pole plate, unbalanced vibration of the diaphragm could be also detected.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A micro speaker, comprising:
    a vibration system including a diaphragm and a voice coil for driving the diaphragm, the diaphragm including a conductive dome and a suspension surrounding the conductive dome;
    the suspension including a pair of long sides, a pair of short sides and arc sides connecting the long sides and the short sides; the suspension further including a plurality of conductive pads located on the arc sides respectively, the conductive dome electrically connected to each of the conductive pads;
    wherein the plurality of conductive pads are configured to output electrical signals;
    a magnetic circuit system including a lower plate, a first magnetic part on the lower plate, a second magnetic part on the lower plate, a pole plate attached to the first magnetic part, one of the first and second magnetic part being a permanent magnet for forming a magnetic gap;
    wherein the pole plate is provided with a lead wire, electrical signals from the pole plate are outputted via the lead wire;
    wherein the pole plate includes a plurality of units isolated from each other, and each unit forms a capacitor together with the conductive dome for outputting electrical signals according to vibrations of the diaphragm and for detecting real-time replacement and unbalanced vibration of the diaphragm.

2. The micro speaker as described in claim 1, wherein the pole plate includes 4 units and accordingly 4 capacitors are formed between the 4 units and the conductive dome.

3. The micro speaker as described in claim 1, wherein the conductive dome is an aluminum foil dome or a compound aluminum foil.

4. The micro speaker as described in claim 1, wherein the suspension is made of silica, and includes a first part and a second part, the first part is made of non-conductive silica and the second part is made of conductive silica, the second part is located at the arc sides.

5. The micro speaker as described in claim 1, wherein the magnetic circuit system further includes a first through hole penetrating the first magnetic part and the lower plate, the electrical signals from the pole plate are outputted via the lead wire through the first through hole.

6. The micro speaker as described in claim 1, wherein the magnetic circuit system further includes a second through hole penetrating the lower plate, the second through hole is located in the magnetic gap, the lead wire for outputting the electrical signals from the pole plate through the second through hole.

7. The micro speaker as described in claim 1 further comprising a non-conductive layer between the pole plate and the first magnetic part.

8. The micro speaker as described in claim 1, wherein the first magnetic part is a permanent magnet, the second magnetic part is sidewalls extending from the lower plate.

9. The micro speaker as described in claim 1, wherein the second magnetic part is a permanent magnet, the first magnetic part is a pillar extending from the lower plate and surrounded by the second magnetic part.

10. The micro speaker as described in claim 1, wherein both of the first and second magnetic parts are permanent magnets.

* * * * *